Sept. 11, 1923.
V. H. MARK
DRAWBAR FOR DRAGS
Filed Feb. 1, 1922
1,467,865
2 Sheets-Sheet 1
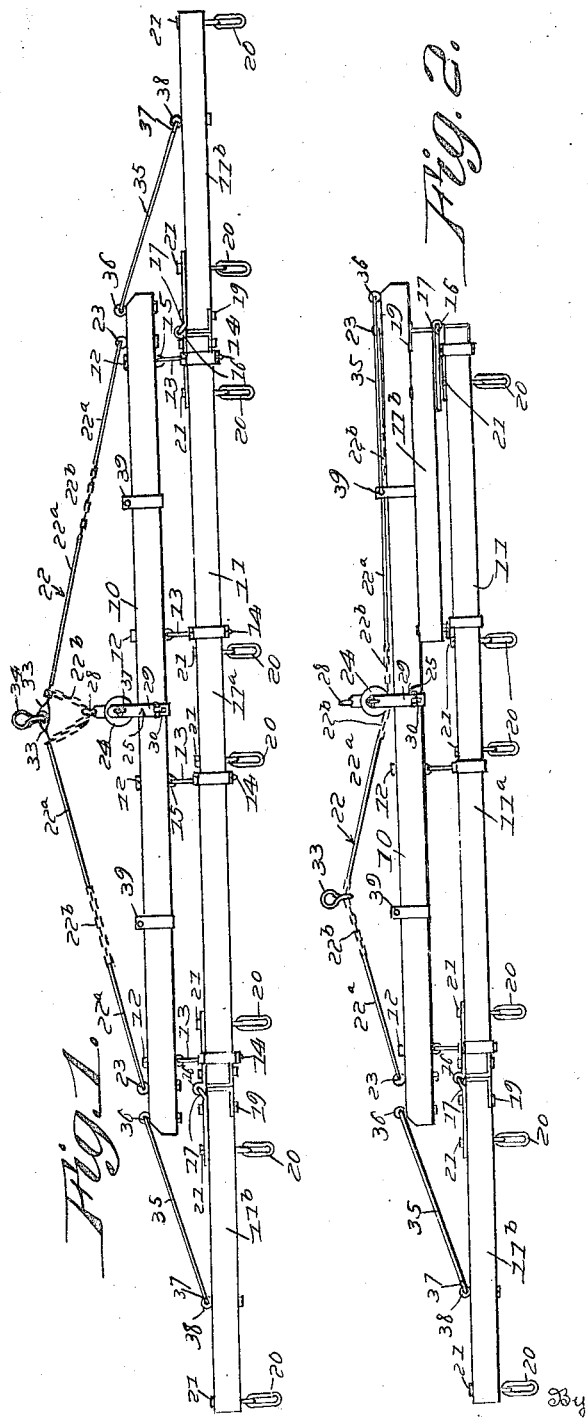
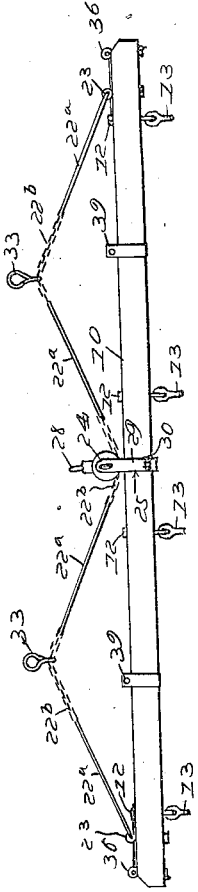
Inventor
Vennice H. Mark,
By
Attorney Sept. 11, 1923.
V. H. MARK
1,467,865
DRAWBAR FOR DRAGS
Filed Feb. 1, 1922
2 Sheets-Sheet 2
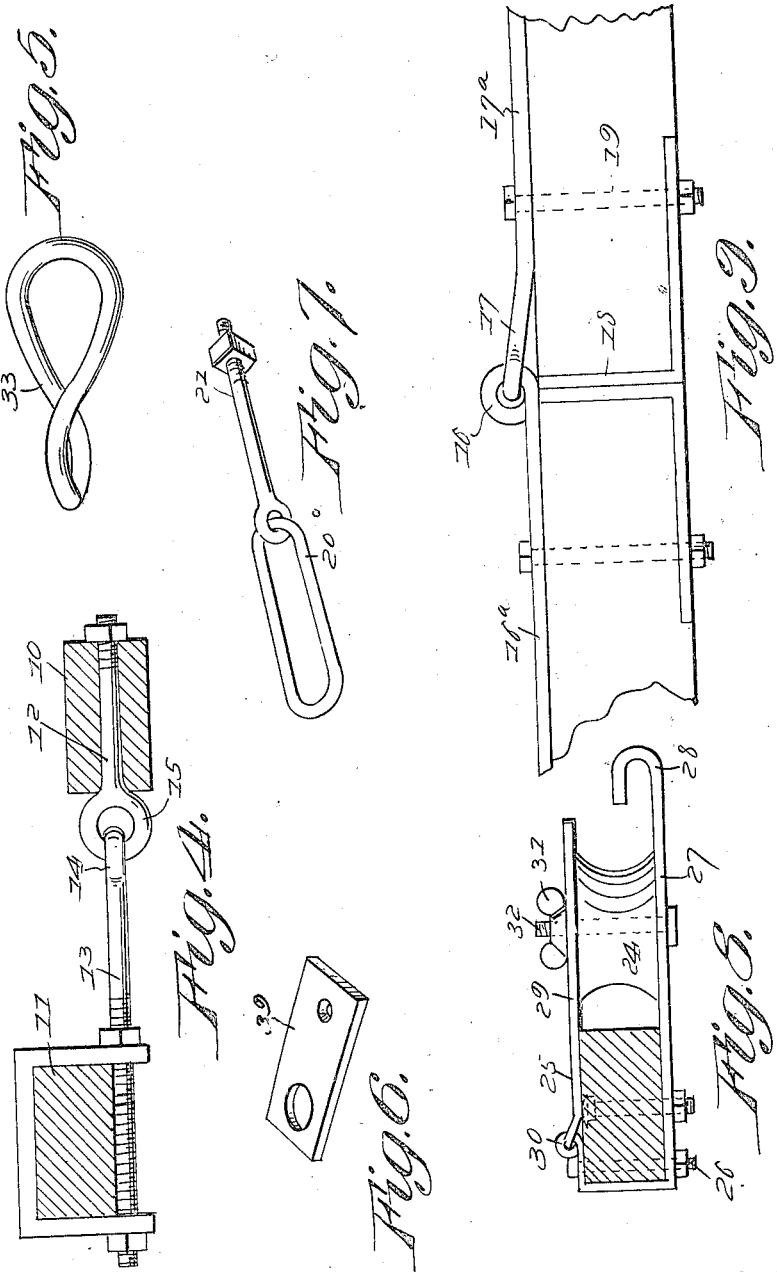

Patented Sept. 11, 1923.

1,467,865

UNITED STATES PATENT OFFICE.

VENNICE H. MARK, OF ALTA, IOWA.

DRAWBAR FOR DRAGS.

Application filed February 1, 1922. Serial No. 533,451.

*To all whom it may concern:*

Be it known that VENNICE H. MARK, a citizen of the United States of America, residing at Alta, in the county of Buena Vista and State of Iowa, has invented new and useful Improvements in Drawbars for Drags, of which the following is a specification.

The object of the invention is to provide a convertible draw bar structure for harrows and drags and similar agricultural implements which embody a plurality of independently movable surface following units or frames connected for convenience with a common transverse beam or its equivalent as a means for the attachment of draft appliances including draft eveners, double and single trees or the equivalents thereof; and in this connection to provide a draft structure which may be adapted by a simple adjustment of the elements thereof as a means of leading two, three, four or more harrow or drag units, and to which draft appliances may be connected for the use of either two or more draft animals; and furthermore to provide a simple means whereby the transverse dimensions of the draft structure may be reduced, either to accommodate a less number of drag units or to pass through a relatively narrow passageway such as a gateway, or for any like purpose without involving special effort or loss of time in making the adjustment and without detracting from the rigidity and efficiency of the structure when in its extended or normal condition; and with these general objects in view the invention consists in a construction and combination of parts of which a preferred embodiment is shown in the accompanying drawings, wherein:—

Figure 1 is a plan view of a draft structure embodying the invention arranged for leading four drag or harrow units.

Figure 2 is a similar view showing the apparatus adjusted for three drag units.

Figure 3 shows the device adjusted for leading two drag units.

Figure 4 is a detail view showing the means used for coupling together in their proper relations the members of the draft structure.

Figure 5 is a detail view of a loop used in connection with the mechanism.

Figure 6 is a similar view of a retainer or keeper employed as a means of supporting the free end of one of the brace rods when not in use.

Figure 7 is a similar view of one of the link carrying eye bolts by which connection is made between the drag elements and the draft structure.

Figure 8 is a detail side view of the equalizing pulley.

Figure 9 is a similar view of the hinge joint between elements of the draft beam.

The structure embodies essentially the parallel front and rear members 10 and 11 which for convenience may be designated respectively as the draft bar, with which the draft appliances are adapted to be connected and the draft beam with which the harrow or drag units (not shown) are adapted to be connected, the draft bar preferably being of unitary structure and uniform length in all uses and adjustment of the apparatus while the draft beam is convertible or variable in length to suit the conditions under which the apparatus is to be employed and particularly the number of harrow or drag units to be used in connection therewith. To the end that such modification in the length of the draft beam may be effected it consists of an intermediate or central body element 11$^a$ of a length approximating that of the draft bar 10 and connected with the latter by tie members consisting in the construction illustrated of eye bolts 12 extending horizontally through the draft bar and a link bolt 13 carried by the main or body element of the draft beam and extended forwardly therefrom with a terminal eye 14 interlocked with the eye 15 of the eye bolt; and foldable terminal elements 11$^b$ hingedly connected with the extremities of the main or intermediate element 11$^a$ with the axis of the hinge arranged vertically at the front side of the beam, and the hinge consisting of a strap eye 16 and a strap loop 17 so relatively disposed as to bring the adjacent ends of the intermediate and terminal elements of the beam into flat abutting relation as indicated clearly in Figure 9, said abutting ends being provided with bearing plates 18 extended terminally in contact with the rear sides of the beam elements and secured thereto by transverse bolts 19 which also serve as the means of securing to the beam elements the metallic straps 16ᵃ and 17ᵃ which respectively carry the hinge elements. This construction of hinge connection provides for such a relation between the elements of the draft beam, when extended as shown in Figure 1, as to insure a rigidity and a strength which is at least equal to that of a solid or unitary beam, and wherein there is no possibility of such flexing as can interfere with the proper leading of the drag units. Each of the draft beam elements is provided with suitable hitching links 20 for attachment of the drag units, and said links are held in place by eye bolts 21 extending through the beam and one of which is indicated in detail in Figure 7.

Carried by the draft bar 10 is a loose draft connection 22 terminally attached to eye bolts 23 near the ends of said bar and of a length greater than the interval between said eye bolts, with the intermediate portion thereof passing in rear of an equalizing pulley 24 (shown in detail in Figure 8) mounted in a bracket 25 which embraces the draft bar at its center to which it is securely bolted as indicated at 26, and which is provided with a fixed cheek 27 terminating in a hook 28, and a movable cheek 29 hinged as at 30 to the body of the bracket and held in place by a thumb nut 31 threaded upon a bolt 32 which connects the cheeks 27 and 29 and forms the axis or spindle of the pulley 24.

The connection 22 may consist of a chain but preferably consists of a series of rod elements 22ᵃ connected by chain elements 22ᵇ so as to afford the necessary flexibility where needed, or where bending sharply in connection with the various adjustments of the apparatus may be required while affording such rigidity at their points as to minimize tendency to kinking or entangling either by the interlocking of the links or by engagement with adjacent objects.

In the adjustment which is indicated in Figure 1, adapted for four section or unit drag, where both of the terminal elements of the main draft beam are arranged in their extended relations, and the draft bar is located in the intermediate position with relation to the length of the draft beam, and it is desirable by reason of the team to be employed that the draft thereof shall be applied at the center of the draft bar, the draft connection 22 is disengaged from the equalizing pulley 24 (this operation being facilitated by the removal of the thumb nut 31 and the pivotal movement of the hinged cheek 29 of the pulley bracket) and hitching links 33 of the double and twisted ring type indicated in detail in Figure 5, are engaged with the connection near the ends of the central flexible element 22ᵇ of said connection and are mutually engaged by a draft clevis 34 to which the draft equalizer, double tree or other draft appliance may be connected.

As a means of reinforcing the terminal elements of the draft beam when extended as shown in Figure 1, and also at one end in Figure 2, it is preferred to employ brace rods 35, each of which is connected with one end of the draft bar through the medium of an eye bolt 36 or its equivalent and is provided at its free end with a hook 37 for detachable engagement with an eye bolt 38 carried by the adjacent terminal element of the draft beam. When as indicated in Figure 2 the terminal element at one end of the draft beam is folded to an inoperative position to form a three-unit drag, the disengaged and therefore unused brace rod at that end of the apparatus may be folded inwardly and engaged at its free end with a retaining eye or keeper 39 carried by the draft bar. With this three-unit adjustment of the parts the draft connection 22 is permitted to extend around the equalizing pulley 24 as shown in Figure 2, the intermediate flexible unit of said connection thus coming into contact with said pulley, and a hitching loop 33 is engaged with that flexible element of the draft connection which is approximately opposite the center of the available portion of the draft beam, so as to locate the draft at about the center of the structure as adjusted. In the adjustment shown in Figure 1 the slack of the intermediate flexible element of the draft connection is engaged with the hook 28 of the pulley bracket.

When the apparatus is adjusted for two-drag unit as shown in Figure 3 the connection of the drag units may be made directly with the draft bar, both of the terminal elements of the draft beam may be folded inwardly as at the right in Figure 2 to lie between the draft bar and the body or intermediate portion of the draft beam, and when it is desired to employ two double-trees in connection with the draft mechanism the draft connection may be arranged as indicated in Figure 3 wherein hitching loops 33 are connected respectively with the two lateral flexible elements 22ᵇ of the draft connection while the intermediate flexible element thereof extends around the equalizing pulley 24.

In this contracted or two-unit form of the apparatus it has all the dimensions adapting it to pass through any ordinary farm gate and hence to be transportable from field to field without involving any inconvenience to the operator.

Having described the invention, what is claimed as new and useful is:—

1. A draw bar structure for drags having a draw bar carrying draft attaching means and a draw beam of extensible construction consisting of an intermediate member attached to and arranged in parallelism with the draw bar and terminal elements movably connected with the extremities of said intermediate element and extending in their adjusted positions beyond the ends of the draw bar, the terminal elements of the draw beam being hingedly connected with the extremities of the intermediate element thereof and being foldable between said intermediate element and the draw bar.

2. A draw bar structure for drags having a draw bar carrying draft attaching means and a draw beam of extensible construction consisting of an intermediate member attached to and arranged in parallelism with the draw bar and terminal elements movably connected with the extremities of said intermediate element and extending in their adjusted positions beyond the ends of the draw bar, the terminal elements of the draw beam being hingedly connected with the extremities of the intermediate element of said beam, with the hinges provided with vertical axes arranged adjacent to the front surface of the beam, and with the extremities of said elements arranged in abutting relation.

3. A draw bar structure for drags having a draw bar carrying draft attaching means and a draw beam of extensible construction consisting of an intermediate member attached to and arranged in parallelism with the draw bar and terminal elements movably connected with the extremities of said intermediate element and extending in their adjusted positions beyond the ends of the draw bar, the terminal elements of the draw bar being hingedly connected with the extremities of the intermediate element of said beam, with the hinges provided with vertical axes arranged adjacent to the front surface of the beam, and with the extremities of said elements arranged in abutting relation, the hinge consisting of a strap eye on one element and a strap loop on the other element.

4. A draw bar structure for drags having a draw bar carrying draft attaching means and a draw beam of extensible construction consisting of an intermediate member attached to and arranged in parallelism with the draw bar and terminal elements movably connected with the extremities of said intermediate element and extending in their adjusted positions beyond the ends of the draw bar, the terminal elements of the draw beam being hingedly connected with the extremities of the intermediate element of said beam, with the hinges provided with vertical axes arranged adjacent to the front surface of the beam, and with the extremities of said elements arranged in abutting relation, and the facing surfaces of said element extremities being provided with bearing plates.

5. A draw bar structure for drags having a draw bar carrying draft attaching means and a draw beam of extensible construction consisting of an intermediate member attached to and arranged in parallelism with the draw bar and terminal elements movably connected with the extremities of said intermediate element and extending in their adjusted positions beyond the ends of the draw bar, the terminal elements of the draw beam being hingedly connected with the extremities of the intermediate element of said beam, with the hinges provided with vertical axes arranged adjacent to the front surface of the beam, and with the extremities of said elements arranged in abutting relation, and the facing surfaces of said element extremities being provided with bearing plates having their extremities extended in contact with the rear surfaces of said elements and secured thereto by hinge fastening bolts.

6. A draw bar structure for drags having a draw bar carrying draft attaching means and a draw beam of extensible construction consisting of an intermediate member attached to and arranged in parallelism with the draw bar and terminal elements movably connected with the extremities of said intermediate element and extending in their adjusted positions beyond the ends of the draw bar, the extremities of the draw bar carrying foldably mounted brace rods having terminal hooks for engagement with eyes carried by the terminal elements of the draw beam.

7. A draw bar structure for drags having a draw bar carrying draft attaching means and a draw beam of extensible construction consisting of an intermediate member attached to and arranged in parallelism with the draw bar and terminal elements movably connected with the extremities of said intermediate element and extending in their adjusted positions beyond the ends of the draw bar, the extremities of the draw bar carrying foldably mounted brace rods having terminal hooks for engagement with eyes carried by the terminal elements of the draw beam, and said draw bar also being provided with retainers for engagement by the terminal hooks of said brace rods when the corresponding elements of the draw beam are folded.

8. A draw bar structure for drags having a draw bar carrying draft attaching means and a draw beam of extensible construction consisting of an intermediate member attached to and arranged in parallelism with the draw bar and terminal elements movably connected with the extremities of said intermediate element and extending in their adjusted positions beyond the ends of the draw bar, said draft attaching means consisting of a draft connection terminally attached to the draw bar at its extremities and of a length greater than the intervals between the points of attachment, and a bracket carried by the draw bar midway between said points of attachment and carrying an equalizing pulley and a draft hook, said bracket being provided with a hinged side cheek and means for securing the same in its normal position.

In testimony whereof he affixes his signature.

VENNICE H. MARK.